(12) United States Patent
Baker et al.

(10) Patent No.: US 9,049,702 B2
(45) Date of Patent: *Jun. 2, 2015

(54) METHOD AND APPARATUS FOR SCHEDULING VARIOUS TYPES OF PEER-TO-PEER COMMUNICATION LINKS

(75) Inventors: Michael H Baker, Elmhurst, IL (US); Jeffrey D. Bonta, Arlington Heights, IL (US); George Calcev, Hoffman Estates, IL (US); Nitin R. Mangalvedhe, Hoffman Estates, IL (US); James P. Michels, Lake Zurich, IL (US); Nathan J. Smith, Savoy, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/339,518

(22) Filed: Dec. 29, 2011

(65) Prior Publication Data

US 2013/0170476 A1     Jul. 4, 2013

Related U.S. Application Data

(63) Continuation-in-part of application No. 12/360,428, filed on Jan. 27, 2009, now Pat. No. 8,305,972, and a continuation-in-part of application No. 12/360,220, filed on Jan. 27, 2009, now Pat. No. 8,879,479.

(51) Int. Cl.
*H04J 3/00* (2006.01)
*H04W 72/04* (2009.01)
*H04W 72/08* (2009.01)

(52) U.S. Cl.
CPC ........ *H04W 72/0406* (2013.01); *H04W 72/082* (2013.01)

(58) Field of Classification Search
None
See application file for complete search history.

(56) References Cited

U.S. PATENT DOCUMENTS

| 5,535,240 | A | 7/1996 | Carney et al. |
| 5,758,090 | A | 5/1998 | Doner |
| 5,848,097 | A | 12/1998 | Carney et al. |
| 6,339,694 | B1 | 1/2002 | Komara et al. |
| 8,305,972 | B2 | 11/2012 | Baker et al. |

(Continued)

FOREIGN PATENT DOCUMENTS

| CN | 1875587 A | 12/2006 |
| KR | 1020060048938 A | 5/2006 |

(Continued)

OTHER PUBLICATIONS

Chinese Office Action for counterpart Patent Application No. 201080005773.9 mailed Aug. 27, 2013.

(Continued)

*Primary Examiner* — Chi H Pham
*Assistant Examiner* — Kouroush Mohebbi
(74) *Attorney, Agent, or Firm* — Steven A. May

(57) ABSTRACT

A base station allocates resources for peer-to-peer communications by creating or updating peer sets from measured performance information received from one or more stations. Based on current resource assignments in each timeslot and based on the peer sets, the base station determines excluded timeslots and preferred timeslots. The base station then marks potential resources in a portion of a resource allocation map. One of the potential resources is allocated for peer-to-peer communication between a transmitter station and one or more receiver stations.

20 Claims, 10 Drawing Sheets

(56) References Cited

U.S. PATENT DOCUMENTS

| | | | |
|---|---|---|---|
| 8,565,183 B2 | 10/2013 | Banerjea | |
| 2004/0125776 A1* | 7/2004 | Haugli et al. | 370/338 |
| 2005/0239451 A1 | 10/2005 | Periyalwar et al. | |
| 2005/0281221 A1 | 12/2005 | Roh et al. | |
| 2006/0126749 A1 | 6/2006 | Armour et al. | |
| 2007/0019668 A1 | 1/2007 | Lee et al. | |
| 2007/0081491 A1 | 4/2007 | Kim et al. | |
| 2007/0104087 A1 | 5/2007 | Tee et al. | |
| 2007/0104129 A1 | 5/2007 | Yang et al. | |
| 2007/0115880 A1 | 5/2007 | Huh et al. | |
| 2007/0121547 A1 | 5/2007 | Huh et al. | |
| 2007/0121666 A1 | 5/2007 | Kim et al. | |
| 2007/0155337 A1 | 7/2007 | Park et al. | |
| 2007/0173198 A1 | 7/2007 | Kim et al. | |
| 2007/0201398 A1 | 8/2007 | Yang et al. | |
| 2007/0201400 A1 | 8/2007 | Kang et al. | |
| 2008/0069062 A1* | 3/2008 | Li et al. | 370/338 |
| 2008/0240267 A1 | 10/2008 | Hassan et al. | |
| 2008/0274729 A1 | 11/2008 | Kim et al. | |
| 2009/0005057 A1* | 1/2009 | Lee et al. | 455/450 |
| 2009/0011768 A1 | 1/2009 | Seok et al. | |
| 2009/0011770 A1* | 1/2009 | Jung et al. | 455/452.1 |
| 2009/0016225 A1 | 1/2009 | Laroia et al. | |
| 2009/0016295 A1* | 1/2009 | Li et al. | 370/330 |
| 2009/0034447 A1* | 2/2009 | Yu et al. | 370/315 |
| 2009/0092055 A1 | 4/2009 | Balasubramanian et al. | |
| 2009/0131061 A1 | 5/2009 | Palanki et al. | |
| 2009/0175178 A1 | 7/2009 | Yoon et al. | |
| 2009/0181692 A1 | 7/2009 | Gaal et al. | |
| 2009/0303939 A1 | 12/2009 | Umesh et al. | |
| 2010/0008244 A1 | 1/2010 | Sampath et al. | |
| 2010/0169498 A1 | 7/2010 | Palanki et al. | |
| 2010/0189046 A1 | 7/2010 | Baker et al. | |
| 2010/0189048 A1 | 7/2010 | Baker et al. | |
| 2010/0202313 A1 | 8/2010 | Barratt et al. | |
| 2010/0260093 A1* | 10/2010 | Liu et al. | 370/315 |
| 2010/0260132 A1 | 10/2010 | Rao | |
| 2011/0019596 A1 | 1/2011 | Li et al. | |
| 2011/0282989 A1* | 11/2011 | Geirhofer et al. | 709/224 |
| 2012/0093098 A1 | 4/2012 | Charbit et al. | |
| 2012/0106517 A1 | 5/2012 | Charbit et al. | |
| 2012/0327889 A1 | 12/2012 | Sayeedi | |

FOREIGN PATENT DOCUMENTS

| | | | |
|---|---|---|---|
| WO | 2006135019 A1 | 12/2006 | |
| WO | 2010049801 A1 | 5/2010 | |
| WO | 2010088154 A2 | 8/2010 | |

OTHER PUBLICATIONS

European Search Report for counterpart Patent Application No. 10736266.7 mailed Sep. 24, 2013.

Non Final Office Action mailed on Jan. 2, 2014 in U.S. Appl. No. 12/360,220, filed Jan. 27, 2009.

Ciochina, C. et al., An Analysis of OFDM Peak Power Reduction Techniques for WiMAX systems, IEEE ICC 2006 Proceedings, pp. 4676-4681.

Christoph, R., "Effects of HPA-Nonlinearity on a 4-DPSK/OFDM-Signal for a Digital Sound Broadcasting System," 2nd European Conference on Satellite Communications, Oct. 22-24, 1991, pp. 179-184.

Draft Standard for IEEE 802.11n D2.00, Part 11: Wireless LAN Medium Access Control (MAC) and Physical Layer (PHY) specifications, Feb. 2007, p. 294.

"Electromagnetic compatibility and Radio spectrum Matters (ERM); ElectroMagnetic Compatibility (EMC) standard for radio equipment and services; Part 1: Common technical requirements," ETSI EN 301 489-1 V1.8.1, 45 pages, (Apr. 2008).

FCC 0FR47 [B8], Section 15 Jul. 10, 2008.

Kim, H. J. et al., "Adaptive clipping technique for reducing PAPR on OFDM systems", IEEE VTC—2003 Fall. 2003 IEEE 58th, vol. 3, pp. 1478-1481 (Oct. 6-9, 2003).

IEEE Standard for Local Metropolitan area networks, Part 16: Air Interface for Fixed Broadband Wireless Access Systems, p. 631, Oct. 2004.

International Search Report and Written Opinion for counterpart International Patent Application PCT/US2012/069812 mailed Feb. 12, 2013.

International Search Report and Written opinion for International Application No. PCT/US2010/021801 mailed on Aug. 6, 2010.

International Search Report and Written opinion for International Application No. PCT/US2010/021778 mailed on Aug. 5, 2010.

International Search Report & Written Opinion for related International Application No. PCT/US2012/071150 mailed on Mar. 13, 2013.

IST-2003-507581 Winner D2.2 V.1.0, "Feasibility of Multi-Bandwidth Transmissions", Oct. 2004.

IST-2003-507581 Winner D7.7 V.1.0, "Winner System Concept Complexity Estimates", Month 24, p. 31.

Non Final Office Action mailed on Dec. 30, 2011 in related U.S. Appl. No. 12/360,428, filed Jan. 27, 2009.

Notice of Allowance mailed Dec. 26, 2013 in related U.S. Appl. No. 13/339,586, filed Dec. 29, 2011.

Non Final Office Action mailed on Mar. 16, 2012 in related U.S. Appl. No. 12/360,220, filed Jan. 27, 2009.

Notice of allowance mailed on Jun. 7, 2012 in related U.S. Appl. No. 12/360,428, filed Jan. 27, 2009.

Office Action mailed Dec. 5, 2011 in related U.S. Appl. No. 12/360,220, filed Jan. 27, 2009.

Non Final Office Action mailed Jun. 20, 2013 in related U.S. Appl. No. 13/339,586, Michael H. Baker, filed Dec. 29, 2011.

* cited by examiner

METHOD AND APPARATUS FOR SCHEDULING VARIOUS TYPES OF PEER-TO-PEER COMMUNICATION LINKS

RELATED APPLICATIONS

The present application is a continuation-in-part of the following United States Patent Applications commonly owned with this application by Motorola Solutions, Inc.: Ser. No. 12/360,428, filed Jan. 27, 2009, titled "Proactive Scheduling Methods And Apparatus To Enable Peer-To-Peer Communication Links In A Wireless OFDMA System", and Ser. No. 12/360,220, filed Jan. 27, 2009, titled "Reactive Scheduling Methods And Apparatus To Enable Peer-To-Peer Communication Links In A Wireless OFDMA System", and is further related to the following United States Patent Application commonly owned with this application by Motorola Solutions, Inc.: Ser. No. 13/339,586, filed Dec. 29, 2011, titled "Method and Apparatus for Scheduling Peer-To-Peer Communication Links", the entire contents of each are incorporated herein by reference.

FIELD OF THE DISCLOSURE

The present disclosure relates generally to wireless communications and more particularly to methods and apparatus for scheduling resources in Orthogonal Frequency-Division Multiple Access (OFDMA) communication networks for peer-to-peer communications among stations operating therein.

BACKGROUND

Orthogonal Frequency-Division Multiple Access (OFDMA) is a multiple access method for sharing a radio frequency (RF) channel among multiple stations. OFDMA uses an orthogonal frequency-division multiplexing (OFDM) digital modulation scheme to modulate information signals. OFDMA can be described as a combination of frequency domain and time domain multiple access. In OFDMA, a communication space is divided into multiple timeslots and each timeslot is further divided into a number of frequency sub-channels, each having at least one of its own sub-carriers. In OFDMA systems, both time and/or frequency resources are used to separate signals to/from multiple stations, wherein transmissions to/from multiple stations are separated using timeslots and sub-channels within each timeslot such that stations' signals can be separated in the time domain and/or in the frequency domain. Thus, in OFDMA, resources can be partitioned in the time-frequency space.

Recently, broadband wireless networks have been developed that implement OFDMA, as described for example in the Institute of Electrical and Electronics Engineers (IEEE) 802.16 standards or in the Long Term Evolution (LTE) standards. As used herein, "IEEE 802.16" refers to a set of IEEE Wireless Metropolitan Access Network (WMAN) standards that govern broadband wireless access methods. Any of the IEEE standards or specifications referred to herein may be obtained at IEEE, 445 Hoes Lane, PO Box 1331, Piscataway, N.J. 08855-1331, USA. LTE is the Third Generation Partnership Project (3GPP) from the European Telecommunications Standards Institute (ETSI). LTE is used to create a high speed wireless data communications network. Any of the ETSI standards or specifications referred to herein may be obtained at 650, Route des Lucioles, 06921 Sophia-Antipolis Cedex, FRANCE.

In a wireless communication system, a near-far problem may exist. The near-far problem refers to the situation where a receiving station receives a low-power signal from a desired transmitting station and a high-power signal from a different transmitting station at the same time, resulting in desensitization or "desense" of a receiver in the receiving station to the low-power signal. In other words, the high-power signal may cause the low-power signal to fall below the receiver's detectability threshold. For instance, when the high power transmitting station is located near the receiving station operating in the same timeslot but on a different frequency sub-channel, the high transmit energy can desensitize the receiver.

Scheduling algorithms are widely used in wireless networks for allocating or distributing communication resources (e.g., timeslots and/or sub-channels) among stations to take advantage of instantaneous channel variations by giving priority to the stations with favorable channel conditions. For instance, in an OFDMA communication system, a base station can include a time-division multiple access (TDMA) scheduler that schedules time/frequency resources used by each uplink communication and each downlink communication. An uplink communication is when a station transmits to the base station and downlink communication is when the base station transmits to a station. The scheduler may assign an uplink communication on different sub-channels within the same timeslot to different stations. In particular, the base station scheduler may schedule these uplink communications either in different timeslots or in the same timeslot and uses power control to prevent/reduce near-far interference among various stations communicating to the base station. Accordingly, the TDMA scheduler avoids near-far problems by creating time-orthogonal uplink and downlink transmissions, and through uplink power control. The scheduler may assign a downlink communication on different sub-channels within the same timeslot from the base station to different stations. The near-far interference issue is avoided in that there is only the single desired transmitter and no interfering transmitter operating simultaneously. These techniques are applicable to time division duplexing (TDD) wireless communication systems where a select orthogonal portion of time has been set aside within the frequency channel for uplink and downlink transmissions and frequency division duplexing (FDD) wireless communication systems where a separate frequency channel is dedicated to uplink and downlink transmissions.

Although the TDMA scheduling techniques described above work well in situations where all stations communicate with and are assigned or scheduled resources by a central base station, these techniques do not work in mixed networks that also include direct station-to-station or "peer-to-peer" communication between stations. When one station connects directly with and communicates directly with another station, this method of communication is referred to herein as one-to-one peer-to-peer communication. With one-to-one peer-to-peer communication, there is no concept of uplink and downlink because communications links occur between the stations. When one-to-one peer-to-peer communication links are allowed to share a portion of the time-frequency resources whether within conventional uplink or downlink resource allocations of TDD/FDD networks or resource allocations occupied by peer-to-peer communication links alone, near-far interference can occur. The near-far interference can desense the base station-to-station and/or station-to-base station communication links or the station-to-station peer-to-peer links.

One-to-one peer-to-peer communication can be directed (centralized scheduling) by a base station or it can be self-directed (distributed scheduling) by the stations involved in the communication. With centralized scheduling, stations communicate with the base station via control channels to exchange information needed for scheduling. With distributed scheduling, stations communicate with each other in order to exchange information needed to schedule resources. Ad-hoc mesh networking may expand the communications range of one-to-one peer-to-peer networks, wherein mesh nodes or stations could collect and forward routing, neighbor list and other information either to a centralized base station scheduler or to stations employing distributed scheduling. OFDMA communication systems allowing one-to-one peer-to-peer communications employing either centralized scheduling or distributed scheduling with or without ad-hoc mesh networking may experience significant near-far interference. These near-far interference issues may increase if the one-to-one peer-to-peer links are allocated resources within the time-frequency map of conventional TDMA uplink/downlink schedulers.

In some systems, one station may transmit information directly to multiple peer stations. This method of transmission is referred to herein as one-to-many peer-to-peer communication. The phrase "peer-to-peer communication" is used herein for both one-to-one and one-to-many peer-to-peer communication. Therefore, in addition to scheduling one-to-one peer-to-peer communication and ad-hoc mesh communication links, an avenue is needed for scheduling one-to-many peer-to-peer communication links, without experiencing significant near-far issues as found in conventional TDMA uplink/downlink scheduling.

Accordingly, it would be desirable to provide scheduling techniques for scheduling various types of peer-to-peer communication links.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
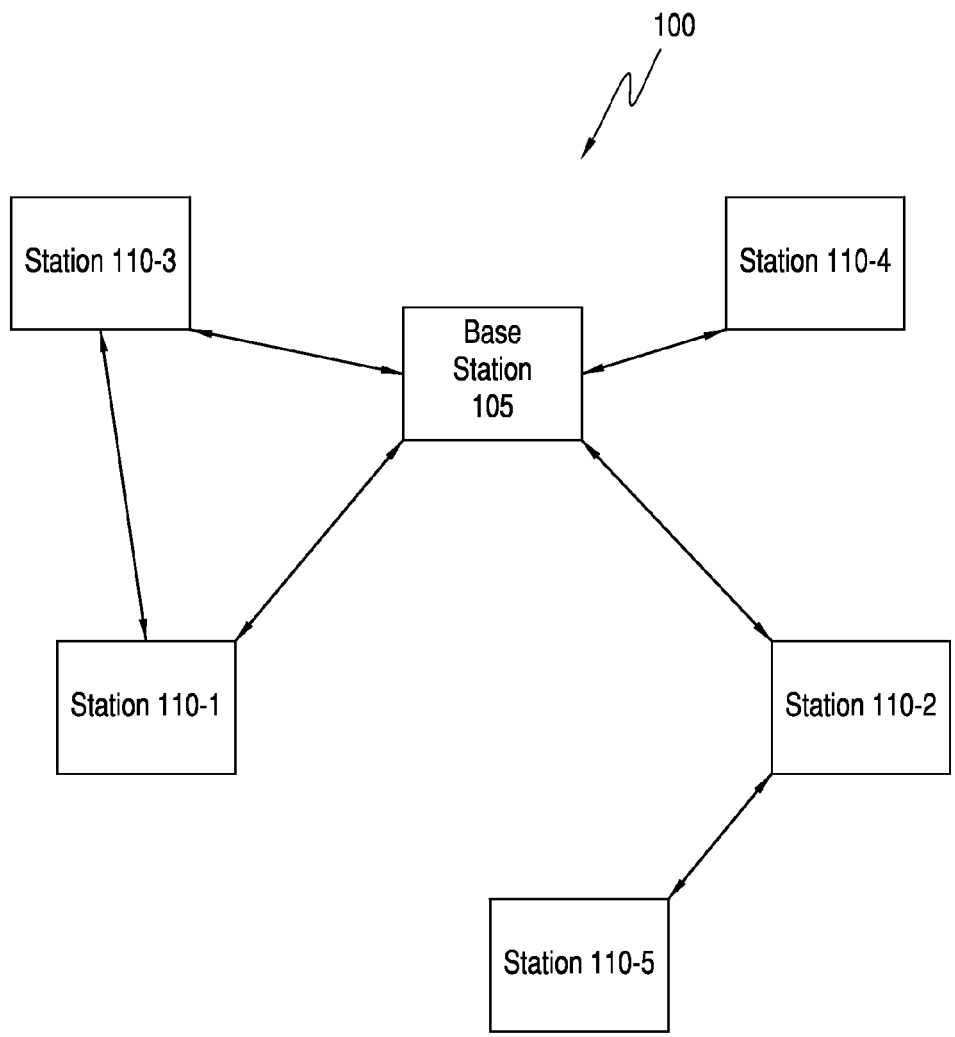
FIG. 1 is a block diagram of a wireless communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for allocating resources for peer-to-peer communications. A base station creates or updates peer sets from measured performance information received from one or more stations. Based on current resource assignments in each timeslot and based on the peer sets, the base station determines excluded timeslots and preferred timeslots. The base station then marks potential resources in a portion of a resource allocation map. At least one of the potential resources is allocated for peer-to-peer communication between a transmitter station and one or more receiver stations.

FIG. 1 is a block diagram of a wireless communication network in accordance with some embodiments. Wireless communication network 100 is capable of operating in compliance with, for example, the 3GPP LTE or IEEE 802.16 standards. Wireless communication network 100 includes subscriber stations 110 (also referred to herein as stations 110) and at least one base station 105. Stations 110 are wireless communication devices enabled to communicate, for example, over Orthogonal Frequency-Division Multiple Access (OFDMA) communication links in one-to-one peer-to-peer communications and/or one-to-many peer-to-peer communications. Stations 110 are also enabled to communicate with base station 105. In some embodiments, each station 110 is potentially mobile (i.e., not fixed) and can be mobile at any particular time, whereas base station 105 may be fixed at a particular location for a predefined period of time. In some embodiments, base station 105 may be movable from one location to another within a predefined period of time. Base station 105 can communicate data and/or control signaling information with stations 110. In network 100, station 110-1 and station 110-5 have direct peer-to-peer communication links with stations 110-3 and 110-2, respectively.

To provide greater control over the network, many decisions are made at base station 105. For example, centralized scheduling algorithms can be implemented within base station 105 and base station 105 can be responsible for making resource scheduling decisions for allocating resources to the various stations 110 operating within a cell that is defined by the base station. Base station 105 schedules uplink resources and downlink resources for its communication with various stations. In addition, base station 105 also schedules resources for direct, peer-to-peer communication links that are used for communications between stations 110.

Figure 2:
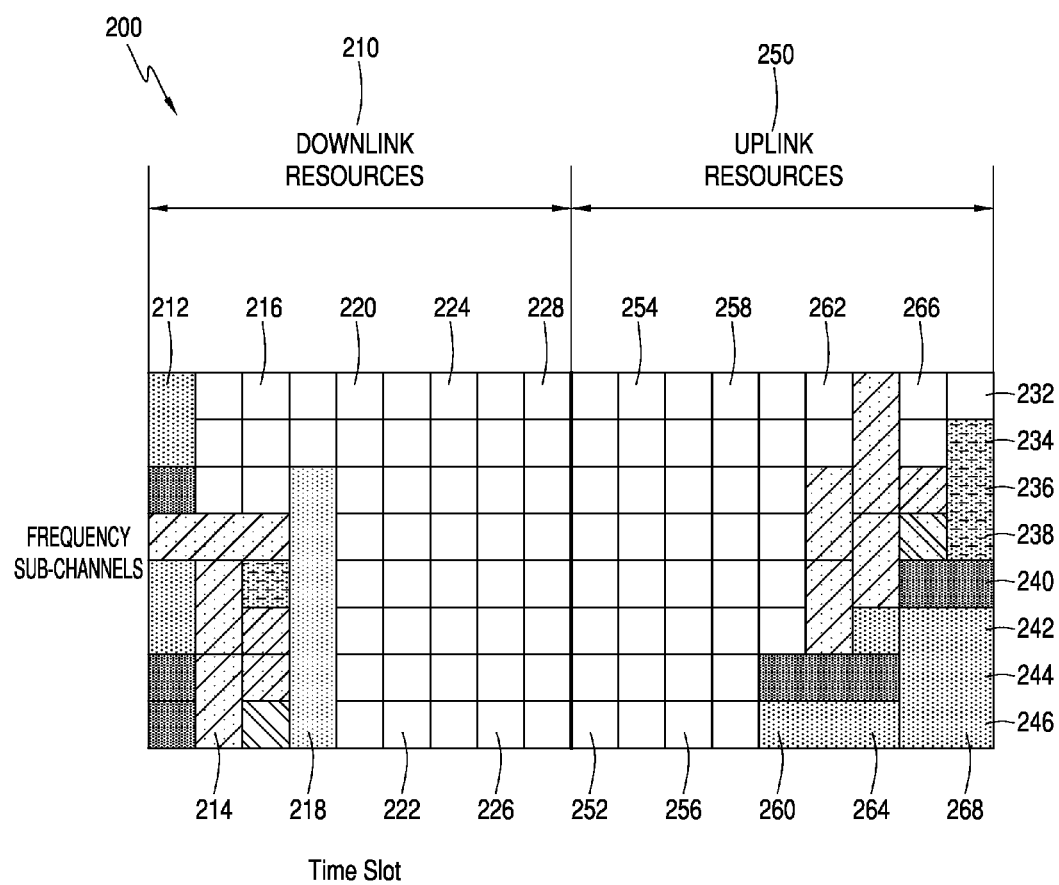
FIG. 2 is a block diagram of resource allocations within a single OFDMA frame in accordance with some embodiments.

FIG. 2 is a block diagram of resource allocations within a single TDMA OFDMA frame in accordance with some embodiments. In the OFDMA frame 200, resources are split into uplink resources in an uplink portion 250 of the frame 200 and downlink resources in a downlink portion 210 of the frame 200. Individual resource allocations within the frame 200 are shown as shaded rectangles. In other words, the shaded rectangles are resources that have been allocated to particular stations. These allocated resources are also maintained by the base station in a list called a resource allocation map. The downlink and uplink portions 210, 250 are groups of timeslots that can also be called, for example, uplink and downlink sub-frames or zones. Typically, the size in time of frame 200 is fixed whereas the partition between downlink and uplink portions 210, 250 can be adjusted. The partition between downlink and uplink portions 210, 250 of the frame 200 and resource allocations of the frame 200 are maintained in the resource allocation map located in the base station's memory in accordance with some embodiments. The resource allocation map includes entries for all downlink (DL) resources and all uplink (UL) resources of the base station, and also specifies which ones of the DL and UL resources are currently/presently allocated and to specific stations.

In this embodiment, time division duplexing (TDD)) is implemented such that the uplink and downlink are allocated different (non-overlapping) time-periods/sub-carriers of the frame. In other embodiments, frequency division duplexing (FDD) may be implemented such that the uplink and downlink are allocated different (non-overlapping) frequency channels. As noted above, OFDM modulation is implemented for downlink and uplink communications and a particular frequency channel is divided into multiple OFDMA timeslots. Each timeslot has a number of subcarriers/sub-channels of a wideband channel. In the resource allocation map, the timeslots correspond to vertical columns 212-228 and 252-268 of frame 200, where the group of timeslots defines an OFDMA frame 200. Subcarriers/sub-channels 232-246 correspond to horizontal rows of the frame 200, where the same subcarriers/sub-channels are used for both uplink and downlink.

Although not illustrated, the resource allocation map could also include specific dedicated "zones." These dedicated zones are portions of frame 200 that are reserved exclusively for or dedicated to direct station-to-station (i.e., "ad hoc" or one-to-one/one-to-many "peer-to-peer") communication links, or alternatively, for direct station-to-relay station communication links. Thus, in one embodiment, direct station-to-station(s) communication links can be interspersed with normal station-to-base station peer-to-peers and/or normal base station-to-station downlinks. In another embodiment, a subset or region or zone of timeslots in the uplink portion/zone 250 and/or downlink portion/zone 210 of the frame 200 can be dedicated or devoted exclusively to direct station-to-station communication links. In this exclusive region, no station-to-base station and/or base station-to-station traffic is allowed or scheduled.

Each shaded-rectangle in FIG. 2 represents a frequency subcarrier/sub-channel and timeslot allocation to a particular station for a particular communication link (either with the base station or with another one or more station). In this example, it is assumed that a diversity subcarrier/sub-channelization scheme is implemented such that different subcarriers/sub-channels within one timeslot can be allocated to different stations in any order. Moreover, the subcarriers/sub-channels assigned to a particular station can vary from timeslot to timeslot (i.e., subcarriers assignments do not need to follow the same pattern in each timeslot). For 3GPP LTE, the minimum time-frequency resource allocation size is called a resource block (RB). For example, for an LTE communication system with a 10 MegaHertz (MHz) channel bandwidth, a RB is equal to two timeslots by twelve sub-carriers, where each sub-carrier is 15 KiloHertz (KHz) wide and each LTE timeslot contains fifty RBs. It should be noted that the resource blocks of different dimensions are also within the scope of the present application. To simplify examples in this document, a RB is defined to be one timeslot by twelve sub-carriers.

Peer stations associated with, for example, high receive signal strength (RSS) can cause the most interference for nearby receiver stations in the same time slot. Therefore it is desirable to schedule transmissions of high RSS peers in different time domain resources than those scheduled for receive by high RSS peer neighbors. In some embodiments, the base station schedules peer-to-peer resources for peer-to-peer communication links using broadcast information elements (IEs) and unicast response messages (RMs). The information elements include a resource map information element (RMIE) and a grant metric information element (GMIE), discussed in more detail below.

The base station proactively allocates peer-to-peer resources by instructing stations on how to collect appropriate information. The stations collect and measure the information requested by the base station and send the collected information to the base station. The base station uses the information sent from the stations to create and update peer-sets of the stations and to schedule inter-peer resources and/or intra-peer resources.

Figure 3:
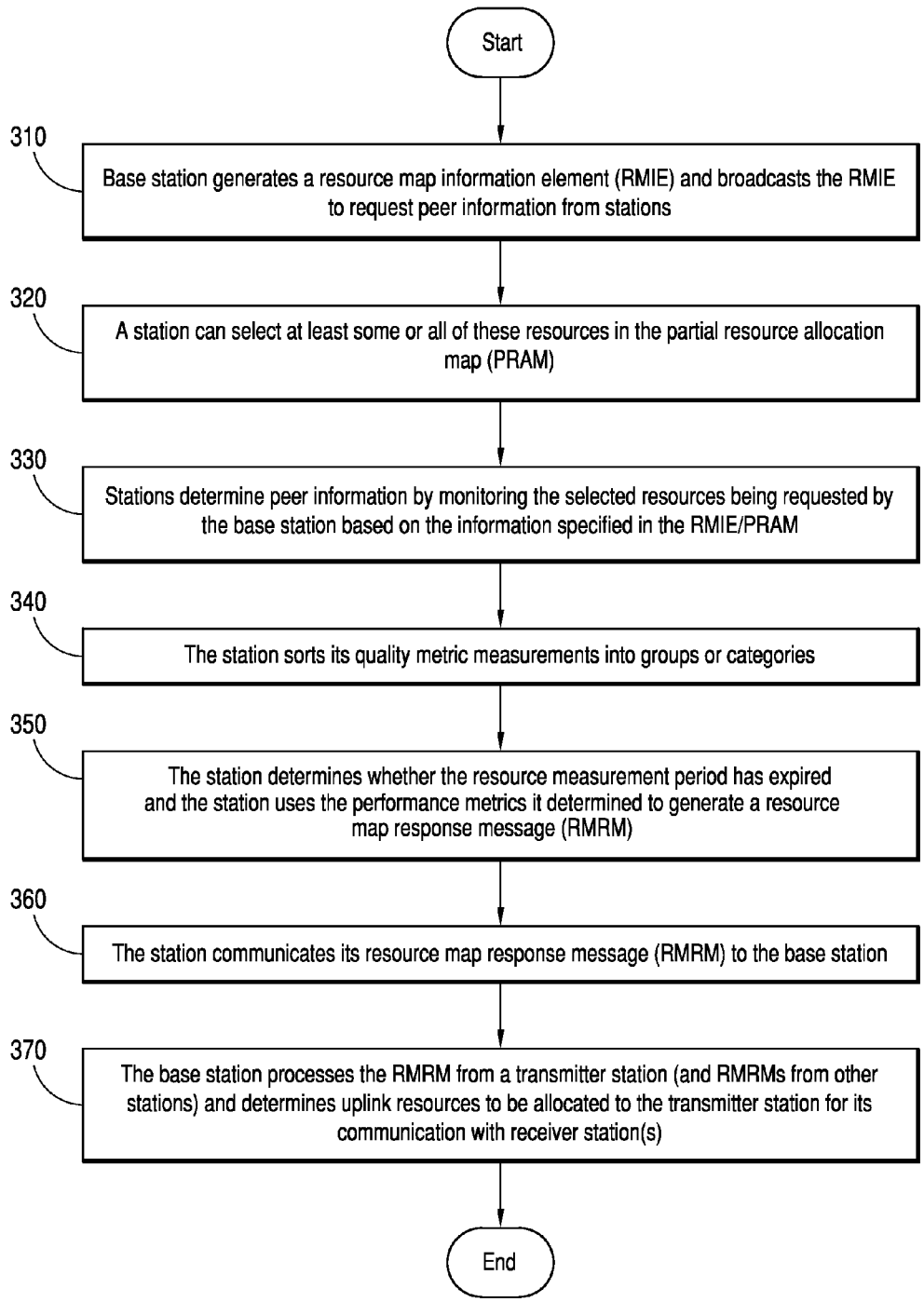
FIG. 3 is a flow diagram of a proactive resource allocation method in accordance with some embodiments.

FIG. 3 is a flow diagram of a proactive resource allocation method in accordance with some embodiments. In 310, the base station generates a resource map information element (RMIE) and broadcasts the RMIE to request peer information from one or more stations. The stations may include a transmitter station that is going to request a resource allocation from the base station. In one implementation, the RMIE includes information that informs the stations about how many and what types of measurements to take for specified performance metrics. The base station may periodically broadcast the RMIE. The RMIE implicitly indicates that peer-to-peer traffic is allowed by the base station due to the fact that the RMIE is transmitted. The RMIE includes partial resource allocation maps (PRAMs), wherein a PRAM is communicated from the base station so that each station knows which resources in a resource allocation map to monitor and so that the station does not have to monitor the entire set of resources. Resources specified in a PRAM can be presently free or presently allocated. In other words, each PRAM specifies resources that the base station wants more information about.

In 320, a station can select at least some or all of these resources in the PRAM. In 330, stations, including the transmitter station, determine (measure or calculate) peer information by monitoring the selected resources being requested by the base station based on the information specified in the RMIE/PRAM. Thus, upon receiving the RMIE, a station measures a particular radio frequency (RF) quality metric described in the RMIE for selected ones of the timeslots specified in the RMIE. The RF quality metrics may be, for example, Receive Signal Strength (RSS), Signal-to-Noise (SNR) and/or Signal-to-Interference-Plus-Noise (SINR) power levels.

In some embodiments, the transmitter station sets the resource measurement variables, starts a timer that specifies a resource measurement period, and begins to monitor an OFDMA channel for selected peer-to-peer resources as specified in the RMIE/PRAM received from the base station. The resource measurement period is set such that the transmitter station will receive one or more OFDMA frames transmitted on the OFDMA channel. The resource measurement period can be a standard value that is known to the transmitter station that is of duration that is long enough to allow accurate measurements. This duration can vary depending upon the implementation. In one embodiment the resource measurement period is selected during system installation and downloaded to all stations.

In some embodiments, the transmitter station monitors the OFDMA channel until it receives a new OFDMA frame from the base station. The OFDMA frame includes a preamble which defines when the OFDMA frame starts. Upon receiving the next OFDMA frame, the transmitter station may begin determining (e.g., measuring and/or calculating) performance metrics for "selected" peer-to-peer resources specified in the RMIE/PRAM received from the base station. The transmitter station may not need to determine performance metrics for all peer-to-peer resources specified in the RMIE/PRAM, but can in some implementations. In some embodiments, the stations are permitted to select particular ones of the peer-to-peer resources specified in the RMIE/PRAM. For example, in one embodiment, the transmitter station can select particular ones of the peer-to-peer resources specified in the RMIE/PRAM and monitor those selected peer-to-peer resources to determine performance metrics (e.g., RSS) associated with the selected peer-to-peer resources. In such embodiments, the portion of the RMIE/PRAM that is monitored is left up to the station. In one specific implementation, the transmitter station can randomly select peer-to-peer resources from the PRAM or randomly select groups of peer-to-peer resources from the PRAM.

In 340, the station sorts its quality metric measurements into groups or categories (for example, high, medium, low, etc). For example, according to one implementation, the transmitter station may categorize the measured RSS levels into high, middle and low measured RSS levels.

In 350, the transmitter station determines whether the resource measurement period has expired. If the resource measurement period has expired, the transmitter station uses the performance metrics it measured or calculated to generate a resource map response message (RMRM). The RMRM includes a partial peer-to-peer resource measurement map (PRMM) for the peer-to-peer resources specified in the PRAM. The PRMM, therefore, includes performance metrics determined by the transmitter station for the selected peer-to-peer resources.

In 360, the transmitter station communicates its RMRM to the base station. The RMRM includes peer information requested by the base station in the RMIE as determined by the transmitter station. Other stations may also transmit their respective RMRMs back to the base station. In some embodiments, at a minimum, any station that is preparing to request a peer-to-peer resource allocation needs to send its RMRM, and at a maximum, every station receiving the RMIE sends its RMRM to the base station.

The transmitter station also transmits a resource request message (RRM) to the base station to request resources for a communication session or "call" with one or more receiver station(s). The RRM indicates the type of communication session the transmitter station is requesting to set up with one or more receiver station(s), including information regarding quality of service (QoS) requirements for the communication session. The RRM can also include information regarding the station type and/or information about the size of the packet to be transmitted by the transmitter station. In one embodiment, the RRM includes the RMRM (and hence the PRMM). In another embodiment, the transmitter station transmits the RMRM separately.

In 370, the base station processes the RMRM from the transmitter station (and RMRMs from other stations) and determines peer-to-peer resources to be allocated to the transmitter station for its communication with the receiver station(s). Thus, the base station uses the PRMM from the transmitter station (along with PRMMs from other stations) to help make peer-to-peer resource allocation decisions. The base station saves the received RMRM and the initial peer-to-peer RRM from the transmitter station in its memory. The base station can determine the amount of resources to be allocated, based on the RMM. For example, the base station may use the information in the RMM to determine the packet size that the transmitter station is requesting to transmit and/or the station type of the transmitter station.

The base station uses the information in stations' RMRMs when applying rules for scheduling or allocating peer-to-peer resources to avoid causing near-far issues. The peer-to-peer resources allocated to the transmitter station are allocated such that stations communicating over different sub-channels of the same timeslot(s) will not cause near-far problems for other stations, including the transmitter station, and likewise communications by the transmitter station over the peer-to-peer resources it has been allocated will not cause near-far problems for other stations. The proactive scheduling methods can accommodate large changes over time in the amount of peer-to-peer traffic by dynamically adjusting the content of the RMIE and RMRM.

Based on the PRMM from the RMRM, the base station updates peer information for the transmitter station that is requesting the peer-to-peer resource grant. At this point in time, only information that the transmitter station has sent in the recent RMRM is used to update the transmitter station's peer information. However, other stations that receive transmissions from the transmitter station may send back the transmitter station's resource allocation in their RMRM. Some embodiments may assume that wireless channels are reciprocal and update the transmitter station's peer information to include stations whose RMRMs contain the transmitter station. The base station extracts measured quality metrics information for each peer station from the PRMM that was received from the transmitter station to create an entry in a peer memory map (PMM) for the transmitter station.

Peer stations associated with, for example high receive signal strength (RSS), can cause the most interference for nearby receiver stations in the same time slot. Therefore it is desirable to schedule transmissions of high RSS peers in different time domain resources than those scheduled for receive by high RSS peer neighbors. When the base station receives PRMMs from each station that requests to transmit peer-to-peer traffic, the base station combines the information from multiple PRMMs received from different stations to create or update peer sets.

For example, the base station processes the PRMM provided by the transmitter station along with other PRMMs from other stations to generate or update "high impact peer sets" of stations that have a high probability of causing near-far issues to each other and "low impact peer sets" that have a low probability of causing near-far issues to each other. As used herein, the phrase "high impact peer set" refers to information that identifies groups of stations that could potentially cause near-far issues if one station that belongs to the peer set transmits while another station that belongs to the peer set is attempting to receive a different transmission from another station that does not belong to the peer set. As used herein, the phrase "low impact peer set" refers to information that identifies groups of stations that are unlikely to cause near-far issues if one station that belongs to the peer set transmits while another station that belongs to the peer set is attempting to receive a different transmission from another station that does not belong to the peer set. It should be noted that interference within a timeslot may be additive such that two or more medium impact peers can cause high impact.

After peer sets are updated, the base station determines which timeslots are excluded ($TS_x$) and preferred ($TS_p$) based on the current station resource assignments in each timeslot, the transmitter station's peer sets in the base station PMM and the receivers' peer sets in the base station PMM. The base station then marks potential timeslots as preferred or excluded in a portion of the resource allocation map maintained at the base station.

In some embodiments, a single transmitter station may request resources to accommodate communications between the single transmitter station and more than one receiver stations. The base station identifies preferable resources to enable the communication links between the single transmitter station and more than one receiver stations. The base station may also reallocate resources when one or more of the selected communication links between the single transmitter station and more than one receiver stations are insufficient to maintain communication.

The resources to be allocated in support of one-to-many peer-to-peer communication links can be found, for example, in an aggregation of the preferred and excluded OFDMA timeslots. The aggregation may be obtained by applying a set of rules to determine the preferred and excluded OFDMA timeslots for the individual peer-to-peer links between the transmitter station and each of the receiver stations in the one-to-many peer-to-peer communication link. The excluded and preferred timeslots are determined based on the rules utilized in the one-to-one peer-to-peer communication link, as described for example in FIG. 5 or FIG. 6 which is discussed in more detail below. Once the aggregation of preferred, excluded, non-preferred and non-excluded OFDMA timeslots has been determined, a resource allocation of an adequate size may be identified from within the peer-to-peer designated OFDMA timeslots. The size of the resource allocation is sufficient to support the communication link from the transmitter station to each of the receiver stations. The transmitter station utilizes the identified resource allocation to support the one-to-many peer-to-peer communication links to the receiver stations.

Figure 8:
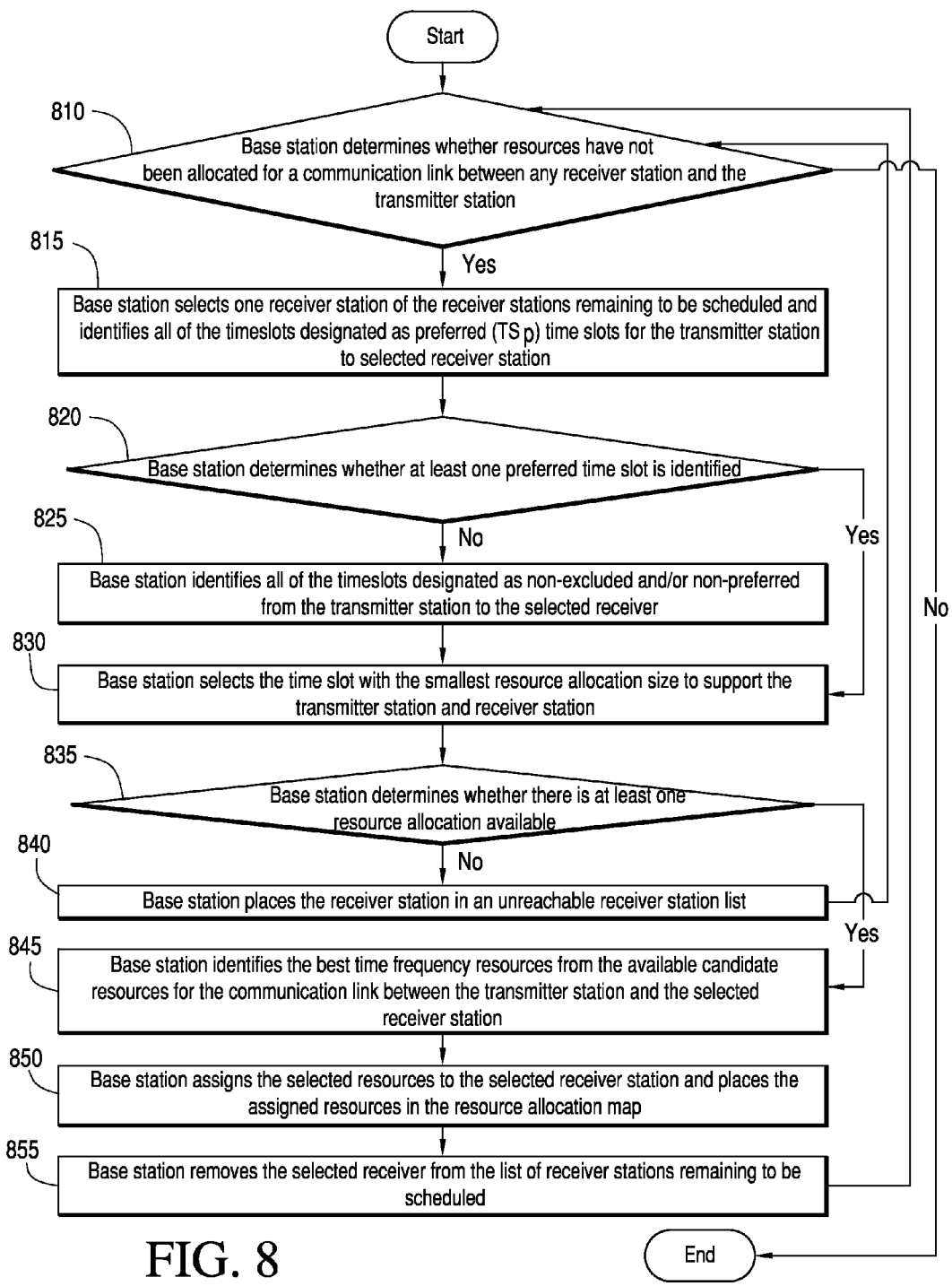
FIG. 8 is a flow diagram of a method for allocating resources in support of a one-to-many peer-to-peer communication link so as to mitigate near-far interference problem in accordance with some embodiments.

In one embodiment, the resources to be allocated in support of a one-to-many peer-to-peer communication link so as to mitigate the near-far interference problem are identified, as shown in FIG. 8 and described in more detail below.

In some embodiments, the base station may create communication groups and identify the preferred and excluded OFDMA timeslots and associated resource allocations for each communication group as a way to schedule the one-to-many OFDMA peer-to-peer communication link. In other embodiments, the aggregation of preferred and excluded OFDMA timeslots is determined for the existing or a pre-defined group of stations, whereby the role of transmitter and receiver stations is changed such that an individual union is determined with each of the stations taking the role of the transmitter station.

To improve scheduling time, the base station may pre-allocate or configure resources for the receiver stations in the event one or more receiver stations may want to transmit information and may therefore request allocation from the base station at a future time. In an effort to support an uninterrupted transition between the roles of transmitter and receivers within the communication group, the preferred and excluded slots could be pre-determined for each station in the group as if it were to assume the role of the transmitter. The base station may also pre-allocate or configure resources for communication groups, wherein the preferred and excluded OFDMA timeslots for a communication group is predetermined and updated on an ongoing basis.

The measurement mechanisms could possibly be enhanced when considering co-operation among the base stations. In an ad hoc network, peer stations at the edge may form a bridge to tell other base station about scheduling and thus obtain a combined PMM.

Multiple transmitter stations can simultaneously request new peer-to-peer resource grants from the base station and the base station can simultaneously receive peer-to-peer resource request messages (RRMs) from multiple stations. As noted above, the base station maintains a resource allocation map, and regularly generates and broadcasts an RMIE. The RMIE specifies a PRAM that indicates portions of the resource allocation map that the base station would like more information about and would like the stations to provide more information about. Prior to requesting a peer-to-peer resource grant, one or more transmitter stations waits for the RMIE. When the transmitter stations receive the RMIE, each station decodes the PRAM of the RMIE to determine which resource measurement variables are being requested by the base station in the RMIE.

In some scenarios, after a communication session or call is in progress, the peer-to-peer resource allocations provided via the proactive scheduling method can become inadequate and near-far issues can occur for the receiver station. In such cases, the receiver station may request a new peer-to-peer resource allocation (or "re-allocation") to reduce and/or eliminate such near-far issues.

Figure 4:
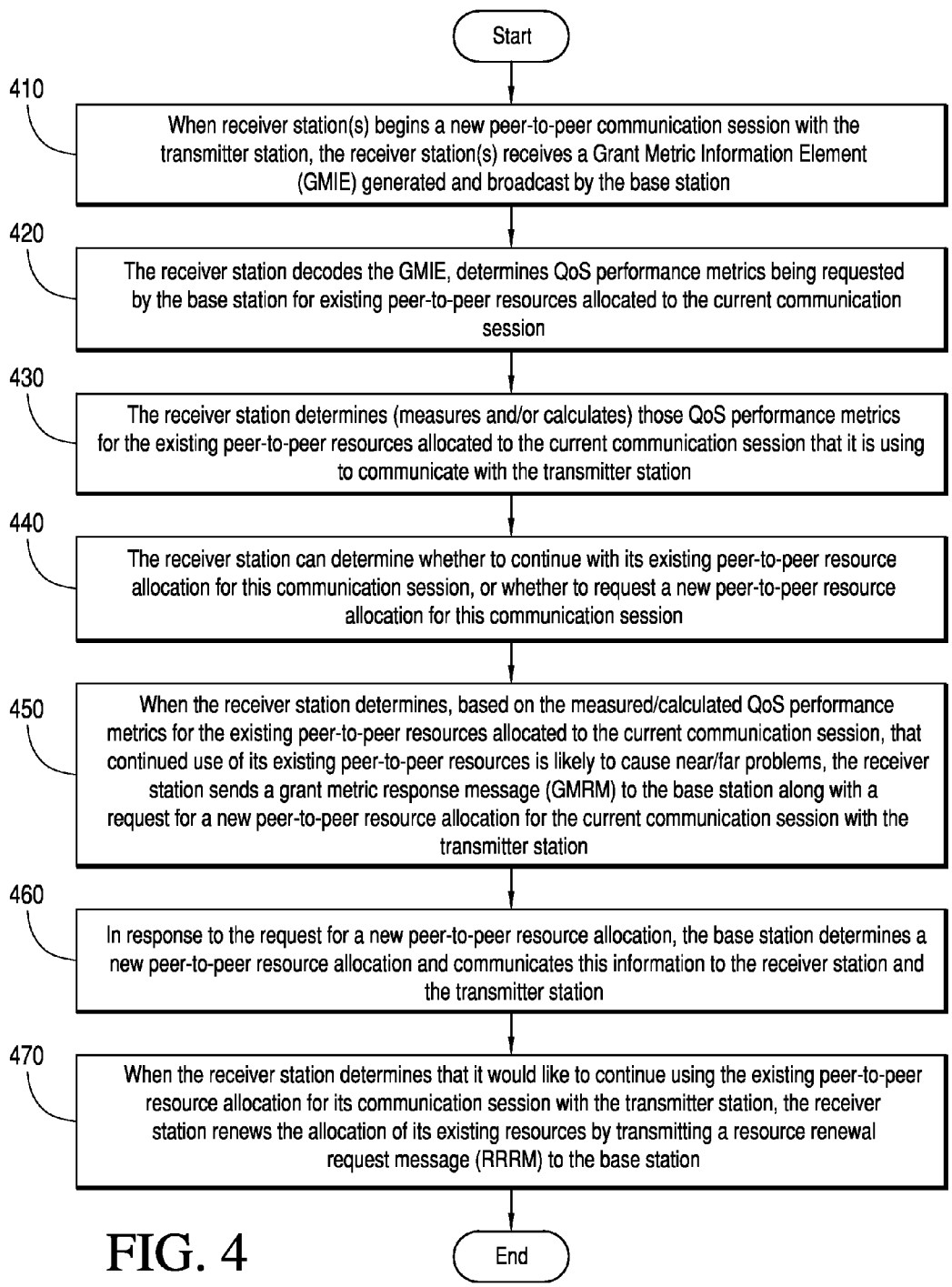
FIG. 4 is a flow diagram of a reactive resource allocation method in accordance with some embodiments.

FIG. 4 is a flow diagram of a reactive scheduling method used in accordance with some embodiments. Reactive scheduling methods allow for potential re-allocation of long-term peer-to-peer resources based on quality of service (QoS) performance metrics and allow the receiver station to recover from scenarios in which the proactive scheduling methods fail for some reason (e.g., station mobility or poor RSS measurements). The reactive approach uses feedback from metrics provided by the receiver station at the time of the resource request to improve schedule resource allocations. In some embodiments, using the reactive approach, the base station re-schedules peer-to-peer communication resources and possibly changes the amount of information the stations collect. For instance, in one implementation, a resource grant is terminated, renewed or reallocated at regular intervals (e.g., approximately every two (2) seconds). When the transmitter station is involved in a current communication session or call with the receiver station using resources granted or allocated to it by the base station as part of a proactive scheduling method, these currently granted resources being used in the active communication session will be referred to below as "existing" resources.

In 410, when receiver station(s) begins a new peer-to-peer communication session with the transmitter station, the receiver station(s) receives a Grant Metric Information Element (GMIE) generated and broadcast by the base station. In one implementation, the GMIE can be broadcast by the base station in a beacon message. The GMIE is used to inform receiver stations of measurements that must be provided by the receiver stations when it is requesting a change in its current resource allocation. The information requested covers the timeslots for a current grant and the requested information is eventually used by the base station to improve peer groupings and to assess whether a resource re-allocation is warranted. In some embodiments, the GMIE informs stations of the type and amount of QoS information the receiver stations are to provide to the base station via a Grant Metric Response Message (GMRM).

In 420, the receiver station decodes the GMIE, determines QoS performance metrics (e.g., frame error rate (FER), signal-to-interference-plus-noise ratio (SINR), analog to digital converters (ADC) desense) being requested by the base station for existing peer-to-peer resources allocated to this communication session. In 430, the receiver station determines (measures and/or calculates) those QoS performance metrics for the existing peer-to-peer resources allocated to the current communication session that it is using to communicate with the transmitter station.

Based on these QoS performance metrics, in 440, the receiver station can determine whether to continue with its existing peer-to-peer resource allocation for this communication session, or whether to request a new peer-to-peer resource allocation for this communication session. Prior to sending a request for a new resource allocation, the receiver station measures metrics, such as, the frame error rate (FER) or signal-to-interference-plus-noise ratio (SINR) for the current grant and also measures RSS over a portion of the resource map as was done for the proactive approach. In 450, when the receiver station determines, based on the measured QoS performance metrics for the existing peer-to-peer resources allocated to the current communication session, that continued use of its existing peer-to-peer resources is likely to cause near/far problems, the receiver station sends a grant metric response message (GMRM) to the base station along with a request for a new peer-to-peer resource allocation for the current communication session with the transmitter station. Both a grant metric response message and the resource map response message are included as part of the re-allocation request that the receiver station sends to the base station.

In 460, in response to the request for a new peer-to-peer resource allocation, the base station determines a new peer-to-peer resource allocation and communicates this information to the receiver station and the transmitter station. The base station schedules the re-allocation grant and informs the receiver station of the new allocation. The base station also decides when timeslot allocations need defragmenting because of incompatible sets of peers. The base station causes the resource allocations for these sets to expire at the same time and informs the stations involved in the current communication session that their resource allocations will be changing. The base station adjusts the beacon resource map information element and the grant metric information element to request an increase or decrease in receiver station measurements based on the base station determination of how well the scheduler is delivering error free communications. For example, the base station would consider the FER rate, the amount of peer to peer traffic, the rate the traffic mix changes from peer-to-peer to base station-station, the cell load, and the desired ability to handle mobility in setting the resource map information element. For low loading and/or little peer-to-peer traffic, little additional resource map and metric information is needed. For high loading and/or high peer-to-peer traffic the resource map and grant metric information elements will request more station information. For the reactive scheduler, the base station may also use the resource map information element or grant metric information as a unicast probe request to a specific station to ask for more detailed resource map information than is required by the beacon information elements.

In 470, by contrast, when the receiver station determines that it would like to continue using the existing peer-to-peer resource allocation for its communication session with the transmitter station, the receiver station renews the allocation of its existing resources by transmitting a resource renewal request message (RRRM) to the base station.

In one non-limiting implementation, the RMIE and GMIE are transported over-the-air (OTA) from a base station using a beacon signal; however, it will be appreciated by those skilled in the art that the RMIE and GMIE can be transported using a wide variety of other mechanisms or messages. Other potential information sources that could be used to carry information included in the RMIE and GMIE include routing messages, active and passive probe messages, hello messages and channel estimation measurements. Thus, any station that is in a communication session and would potentially require a new resource allocation, upon receiving the GMIE, measures quality of service (QoS) metrics described by the GMIE for each timeslot that it has been allocated. For example, if a receiver station is receiving in timeslots 3 and 4, then it would measure QoS metrics during the communication session on timeslots 3 and 4. The station then reports these QoS metrics in the GMRM.

As traffic changes from base station-to-station and/or peer-to-peer, the base station can adjust the RMIE and/or GMIE to adjust the amount of information collected by the stations and sent to the base station for creation of the peer sets needed to prevent near-far scheduling issues. The base station also adjusts the RMIE and the GMIE to request an increase or decrease in the receiver station measurements based on the base station perception of how error free the communication session is. For low loading and/or little peer-to-peer traffic, little additional peer-to-peer resource information is needed. Only a small amount of peer-to-peer RSS resource information and QoS metrics are required from the receiver stations. When this is insufficient for the base station to figure out what is happening, it can put in a temporary request for additional information from a specific receiver station. In one implementation, when the base station has a particular station that it has trouble scheduling, the base station can unicast an RMIE to this station that requires different measurements than the standard broadcast RMIE. Using unicast requests for additional information via the RMIE and GMIE can provide the information needed by a base station to improve peer group sets without significant network overhead.

The set of rules for the one-to-many peer-to-peer communication links may differ based on whether the resource allocation is proactive or reactive. The reactive method of allocation may need to consider the needs of many receiver stations over the needs of one receiver station.

Figure 5:
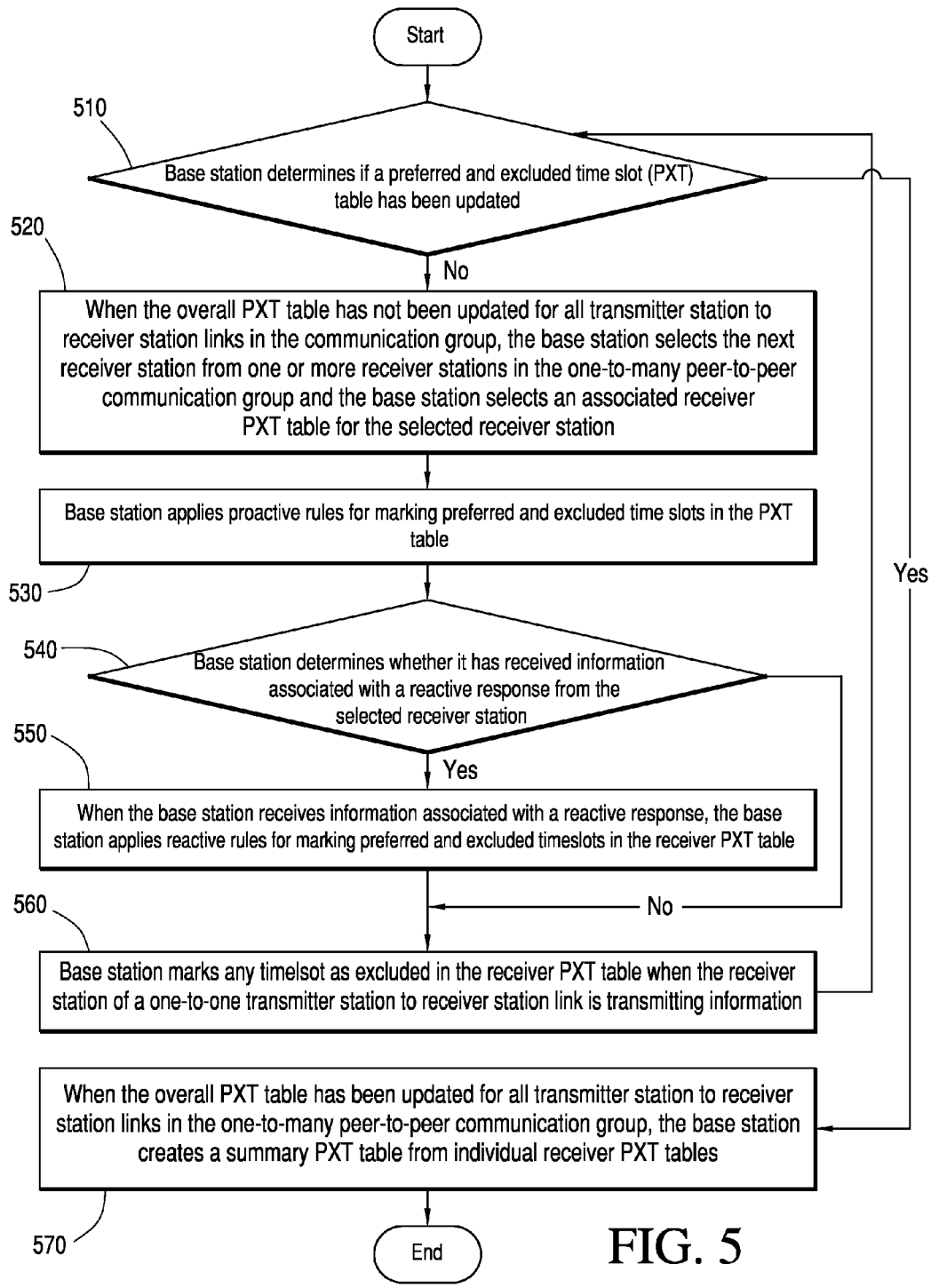
FIG. 5 is a flow diagram of a method for applying rules for assigning preferred and excluded timeslots for a one-to-many peer-to-peer communication in accordance with some embodiments.

FIG. 5 is a flow diagram of a method for applying rules for assigning preferred and excluded timeslots for a one-to-many peer-to-peer communication in accordance with some embodiments. In 510, the base station determines if an overall preferred and excluded timeslot (PXT) table has been updated for all one-to-one transmitter station to receiver station links in the one-to-many communication group. In 520, when the overall PXT table has not been updated for all transmitter station to receiver station links in the communication group, the base station selects the next receiver station from one or more receiver stations in the one-to-many peerto-peer communication group and the base station selects an associated receiver PXT table for the selected receiver station. In 530, the base station applies proactive rules for marking preferred and excluded timeslots in the PXT table. In 540, the base station determines whether it has received information associated with a reactive response from the selected receiver station. In 550, when the base station receives information associated with a reactive response, the base station applies reactive rules for marking preferred and excluded timeslots in the receiver PXT table. In 560, the base station marks any timeslot as excluded in the receiver PXT Table when the receiver station of one-to-one transmitter station to receiver station link is transmitting information and returns to 510. In 570, when the overall PXT table has been updated for all transmitter station to receiver station links in the one-to-many peer-to-peer communication group, the base station creates a summary PXT table from individual receiver PXT tables. The base station goes through each transmitter station to one or more receiver station link in the summary PXT table and marks preferred and excluded stations for each timeslot.

Figure 6:
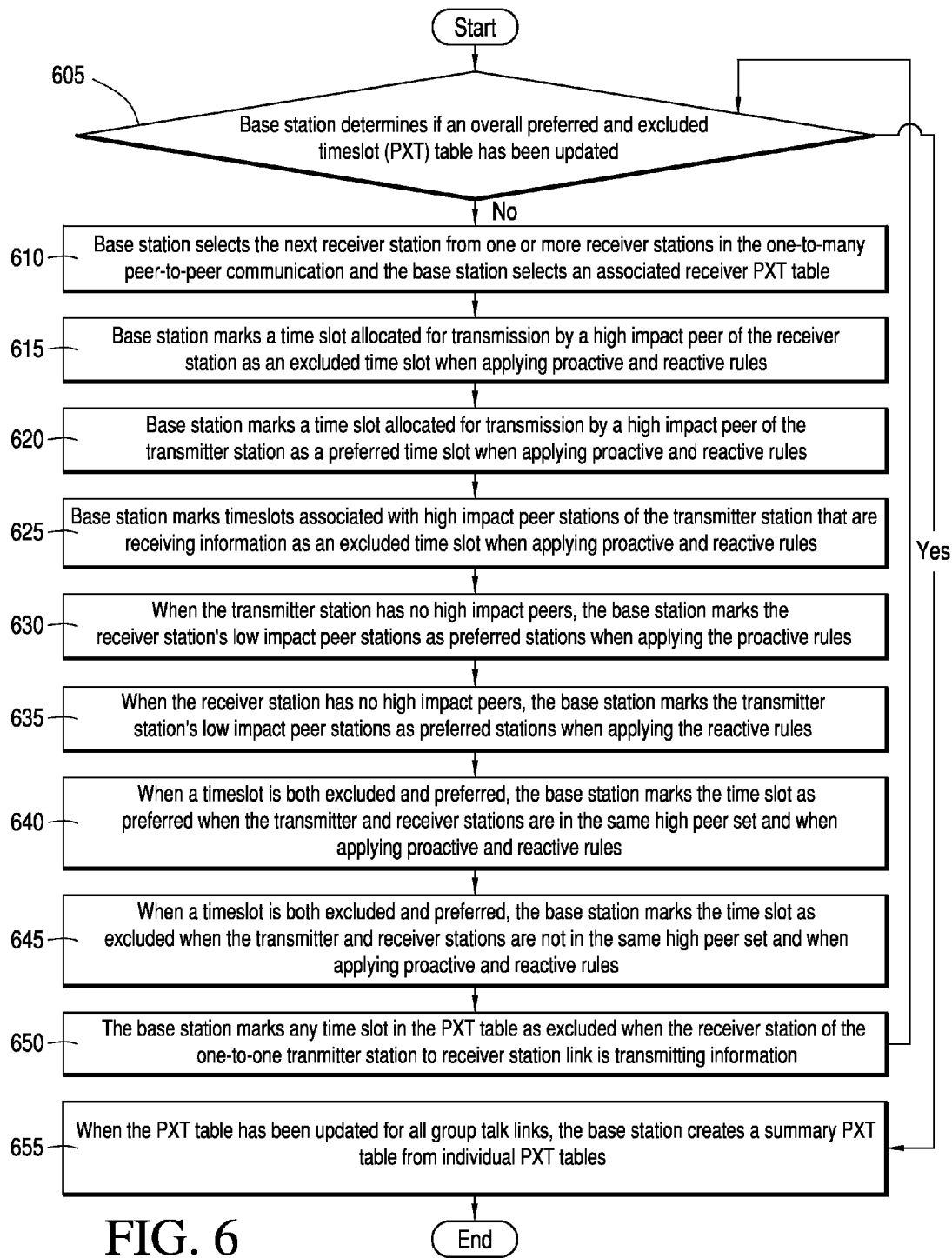
FIG. 6 is another flow diagram of a method for applying rules for assigning preferred and excluded timeslots for a one-to-many peer-to-peer communication in accordance with some embodiments.

FIG. 6 is another flow diagram of a method for applying rules for assigning preferred and excluded timeslots for a one-to-many peer-to-peer communication in accordance with some embodiments. In 605, the base station determines if an overall preferred and excluded timeslot (PXT) table has been updated for all one-to-one transmitter station to receiver station links in the communication group. In 610, when the overall PXT table has not been updated for all transmitter station to receiver station links in the communication group, the base station selects the next receiver station from a one or more receiver station in the one-to-many peer-to-peer communication and the base station selects an associated receiver PXT table. In 615, the base station marks a timeslot allocated for transmission by a high impact peer of the receiver station as an excluded timeslot when applying proactive and reactive rules. In 620, the base station marks a timeslot allocated for transmission by a high impact peer of the transmitter station as a preferred timeslot when applying proactive and reactive rules. In 625, the base station marks timeslots associated with high impact peer stations of the transmitter station that are receiving information as excluded timeslots when applying proactive and reactive rules. In 630, when the transmitter station has no high impact peers, the base station marks the receiver station's low impact peer stations as preferred stations when applying the proactive rules. In 635, when the receiver station has no high impact peers, the base station marks the transmitter station's low impact peer stations as preferred stations when applying the reactive rules. In 640, when a timeslot is both excluded and preferred, the base station marks the timeslot as preferred when the transmitter and receiver stations are in the same high peer set and when applying proactive and reactive rules. In 645, when a timeslot is both excluded and preferred, the base station marks the timeslot as excluded when the transmitter and receiver stations are not in the same high peer set when applying proactive and reactive rules. In 650, the base station marks any timeslot in the PXT as excluded when the receiver station of the one-to-one transmitter station to receiver station link is transmitting information. In 655, when the PXT table has been updated for all transmitter station to receiver station links in the one-to-many peer-to-peer communication group, the base station creates a summary PXT table from individual PXT tables. The base station goes through each transmitter station to one or more receiver station link in the summary PXT table and marks preferred and excluded stations for each timeslot.

Figure 7A:
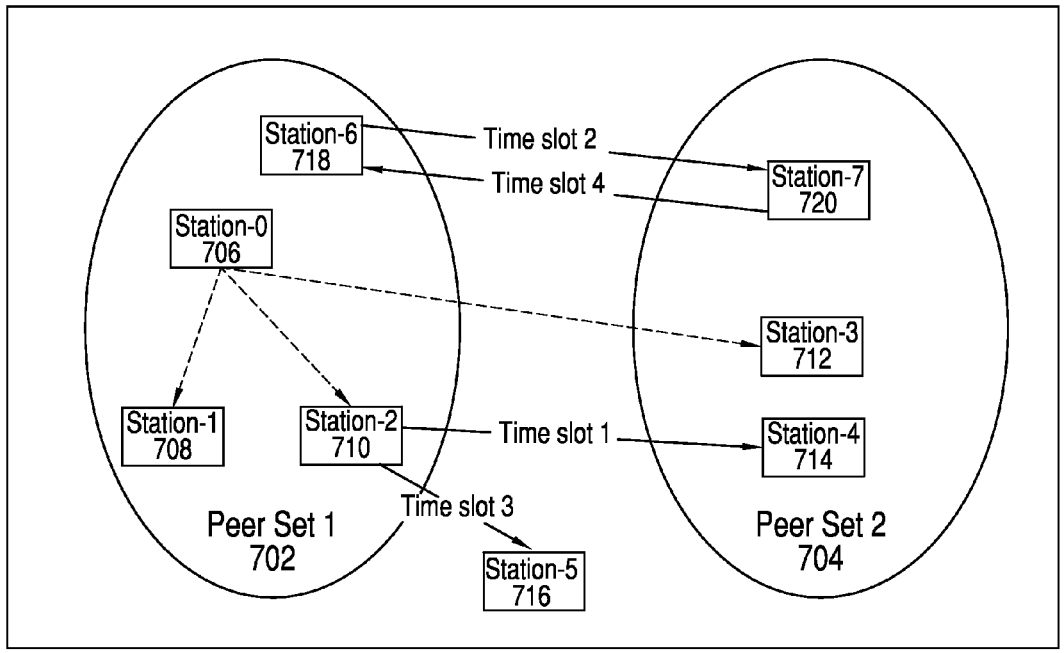
FIG. 7A is a block diagram of a network and time slots/resources assigned to stations associated with communication groups in accordance with some embodiments.

FIG. 7A is a block diagram of a network and time slots/resources assigned to stations associated with communication groups in accordance with some embodiments. Based on current resource assignments in each timeslot and based on the high impact peer set-1 702 and peer set-2 704, as shown in FIG. 7A, the base station determines excluded timeslots and preferred timeslots. In addition to the resource assignment shown in FIG. 7A, the base station needs to establish a communication group for station-0 706 wherein station-0 706 is transmitting information to station-1 708, station-2 710 and station-3 712 in the presence of transmissions between station-2 710, station-6 718 and station-7 720 and given the two current high impact peer sets. In the example in FIG. 7A, station-6 718 is currently transmitting to station-7 720 in timeslot 2, station-7 720 is transmitting to station-6 718 in timeslot 4, station-2 710 is transmitting to station-4 714 in timeslot 1 and station-2 710 is transmitting to station-5 716 in timeslot 3. Taking the use of the timeslots into consideration, the base station determines the preferred and excluded timeslots from station-0 706 to each of station-1 708, station-2 710 and station-3 712, respectively, as shown in tables A, B, and C below by applying, for example, the rules of FIG. 6 to each link:

TABLE A

| Timeslot | Preferred Stations | Excluded Stations |
|---|---|---|
| 1 | $S_0 \rightarrow S_1$ | |
| 2 | $S_0 \rightarrow S_1$ | |
| 3 | $S_0 \rightarrow S_1$ | |
| 4 | | $S_0$ |
| 5 | | |

Preferred and Excluded Timeslot Table for Station-0 706 to Station 1-708

TABLE B

| Timeslot | Preferred Stations | Excluded Stations |
|---|---|---|
| 1 | | $S_2$ |
| 2 | $S_0 \rightarrow S_2$ | |
| 3 | | $S_2$ |
| 4 | | $S_0$ |
| 5 | | |

Preferred and Excluded Timeslot Table for Station-0 706 to Station 2-710

TABLE C

| Timeslot | Preferred Stations | Excluded Stations |
|---|---|---|
| 1 | $S_0 \rightarrow S_3$ | |
| 2 | $S_0 \rightarrow S_3$ | |
| 3 | $S_0 \rightarrow S_3$ | |
| 4 | | $S_3, S_0$ |
| 5 | | |

Preferred and Excluded Timeslot Table for Station-0 706 to Station-3 712

Upon determining the preferred and excluded timeslots from station-0 706 to each of station-1 708, station-2 710 and station-3 712, the base station creates a summary communication group table of preferred station links and excluded station links. The preferred station links are an aggregation of individual preferred links and the excluded station links are an aggregation of individual excluded links. An example of the summary communication group table is shown in table D.

TABLE D

| Timeslot | Preferred Stations | Excluded Stations |
|---|---|---|
| 1 | $S_0 \rightarrow S_1$<br>$S_0 \rightarrow S_3$ | $S_2$ |
| 2 | $S_0 \rightarrow S_1$<br>$S_0 \rightarrow S_2$<br>$S_0 \rightarrow S_3$ | |
| 3 | $S_0 \rightarrow S_1$<br>$S_0 \rightarrow S_3$ | $S_2$ |
| 4 | | $S_3, S_0$ |
| 5 | | |

Preferred and Excluded Timeslot Table for Station-0 706

The base station then creates a communication group resource map for station-0 706 as shown in table E.

TABLE E

| Timeslot | Preferred Station 0 Link | Non-Excluded Station 0 Links | #RB |
|---|---|---|---|
| 1 | $S_0 \rightarrow S_1$<br>$S_0 \rightarrow S_3$ | None | 8<br>4 |
| 2 | $S_0 \rightarrow S_1$<br>$S_0 \rightarrow S_2$<br>$S_0 \rightarrow S_3$ | | 2<br>2<br>8 |
| 3 | $S_0 \rightarrow S_1$<br>$S_0 \rightarrow S_3$ | | 4<br>8 |
| 4 | None | None | |
| 5 | None | $S_0 \rightarrow S_1$<br>$S_0 \rightarrow S_2$<br>$S_0 \rightarrow S_3$ | 4<br>4<br>4 |

Communication Group Resource Map for Station-0 706

Figure 7B:
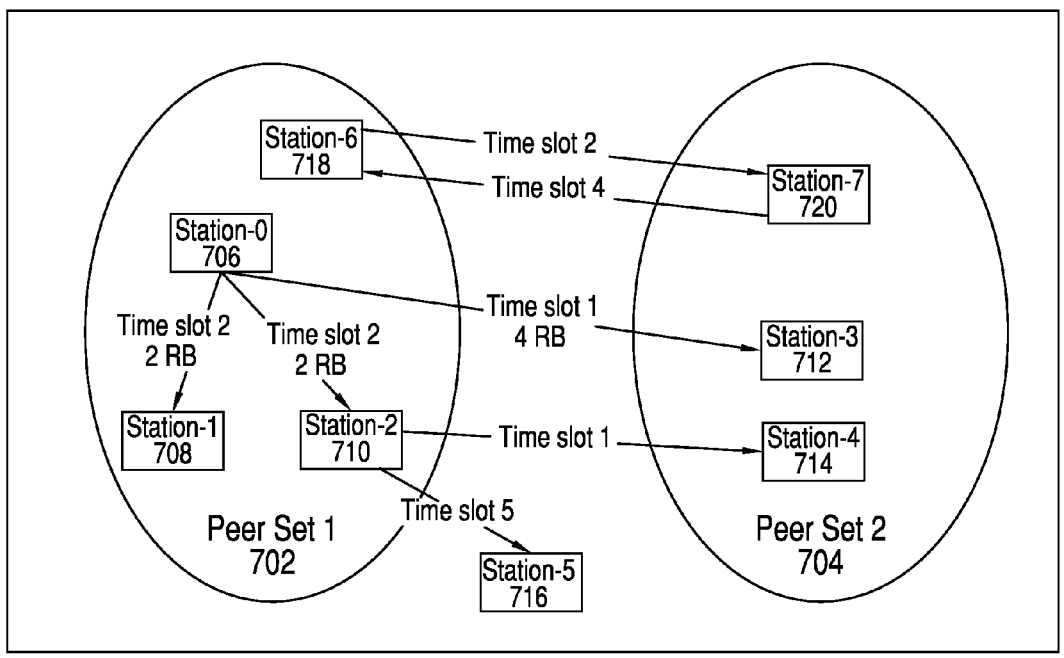
FIG. 7B is a block diagram of a network and time slots/resources assigned to stations based on the resource allocation of FIG. 7A in accordance with some embodiments.

Using the communication group resource map, the base station selects common peer sets to minimize the total resource block (RB) allocation by following, for example, the flow diagram described in the embodiment shown in FIG. 8 below. Applying the embodiment described in FIG. 8 to the information shown in Table E, the base station selects timeslots and RB allocations for the three one-to-one peer-to-peer links from station-0 706 to station-1 708, station-2 710 and station-3 712 as shown in FIG. 7B, wherein timeslot 2 and 2 RBs are selected for the link between station-0 706 and station-1 708, timeslot 2 and 2 RBs are selected of the link between station-0 706 and station-2 710, and timeslot 1 and 4 RBs are selected for the link between station-0 706 and station-3 712. It be noted that there are different interpretations of what might be optimal resources for the scheduler to assign to a one-to-many communication link based on the near far information in Table E. FIG. 8 represents one possible embodiment. Other embodiments may use peer set information to minimize interference during a one-to-many peer-to-peer communication link.

FIG. 8 is a flow diagram of a method for allocating resource in support of a one-to-many peer-to-peer communication link so as to mitigate the near-far interference problem in accordance with some embodiments. In 810, the base station determines whether resources have not been allocated for a communication link between any receiver station and the transmitter station. If there are receiver stations for which resources have not been allocated, in step 815, the base station selects one receiver station of the receiver stations remaining to be scheduled and identifies all of the timeslots designated as preferred (TS$_p$) timeslots for the transmitter station to selected receiver station. In 820, the base station determines whether at least one preferred timeslot is identified in 815. In 825, when no preferred timeslot is identified in 820, the base station identifies all of the timeslots designated as non-excluded and/or non-preferred from the transmitter station to selected receiver. It is from these identified timeslots that the resources to support the communication link between the transmitter station and selected receiver station will be taken.

The base station determines the unique time frequency resources of some resource block (RB) allocation size as candidates to be allocated for the one-to-one peer-to-peer communication link between the transmitter station and a given receiver station for each of the timeslots designated as preferred (TS$_p$) and non-excluded and/or non-preferred for the one-to-one peer-to-peer communication link. The time frequency resources selected as candidate resources for the given receiver station may or may not be determined as the candidate resources for another receiver station in the one-to-many peer-to-peer communication link. If the candidate time frequency resources for more than one of the receiver stations within a given timeslot are identical, the one candidate time frequency resource can be used to simultaneously support the communication link between the transmitter station and more than one receiver stations.

In 830, the base station selects the timeslot with the smallest resource allocation size to support the transmitter station and receiver station. In 835, the base station determines whether there is at least one resource allocation available. When no candidate resources are available, the communication link between the transmitter station and the selected receiver link can be not be scheduled and, in step 840, the base station places the receiver station in an unreachable receiver station list. As the resource allocations for the given one-to-many peer-to-peer communication expires or the resource allocations are determined again in a reactive manner, the base station attempts to find a resource allocation for any receiver station placed in the unreachable receiver station list.

In 845, when candidate resources are available, the base station identifies the best time frequency resources from the available candidate resources for the communication link between the transmitter station and selected receiver station. In one embodiment, the best resources are those that minimize the total resource allocation size to support the one-to-many communication link. The total resource allocation size is the sum of unique time frequency resources selected to support the communication link between the transmitter station and reachable receiver station(s). In other embodiments, the best resources are those that minimize the use of non-excluded and/or non-preferred timeslots. In further embodiments, the best resources are those that maximize the reuse of time frequency resources among the one or more receiver station(s).

In step 850, the base station assigns the selected resources to the selected receiver station and places the assigned resources in the resource allocation map. In step 855, the base station removes the selected receiver from the list of receiver stations remaining to be scheduled.

Consider the following example where resources are selected as shown in FIG. 7B by applying the embodiment described in FIG. 8 to the information shown in Table E. At 810, the base station determines that resources need to be allocated for receiver stations 1, 2, and 3 when transmitter station 0 is creating communication links for a communication group. At 815, the base station selects the first receiver station, for example station 1, and determines that it has preferred timeslots 1, 2 and 3. At 830, the base station selects timeslot 2 because timeslot 2 only requires two resource blocks for the communication link from station 0 to station 1. At 850, timeslot 2 is placed into the resource allocation table for receiver station 1. At 855, the base station removes station 1 from the list of communication group receiver stations that remain to be scheduled. The process returns to 810 where the base station determines that additional resources still need to be allocated. The base station applies the elements of FIG. 8 to stations 2 and 3 and the base station determines that receiver station 2 also has a minimum of two allocated resource blocks when assigned to timeslot 2 and that receiver station 3 has a minimum of four allocated resource blocks when assigned to timeslot 1.

In another embodiment of scheduling the resources to support the one-to-many peer-to-peer communication link, the base station processes sequentially in time through all preferred timeslots. With each new timeslot, time frequency resources are determined and scheduled for each of the one or more receiver stations that have designated the current timeslot as preferred. If one of the receiver stations has already been scheduled in a previous preferred timeslot, the previous resource allocation size is compared against the current resource allocation size and the smaller of the two selected to be scheduled. If one or more receiver stations of the one-to-many communication link have not been scheduled after processing all preferred timeslots, the non-excluded/non preferred timeslots are processed to determine and schedule suitable time frequency resources. In a further embodiment, the preferred and non-excluded/non-preferred timeslots are processed sequentially in time to determine and schedule suitable time frequency resources.

Figure 9:
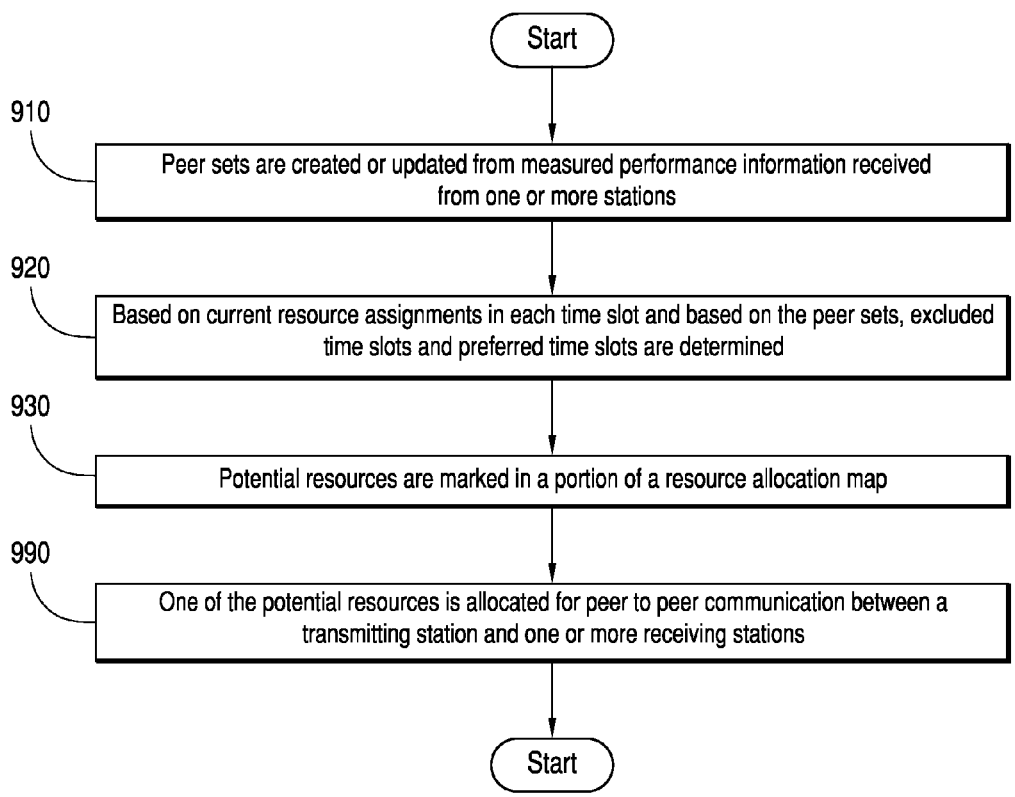
FIG. 9 is a flow diagram of a method for allocating resources for peer-to-peer communications in accordance with some embodiments.

FIG. 9 is a flow diagram of a method for allocating resources for peer-to-peer communications in accordance with some embodiments. In 910, peer sets are created or updated from measured performance information received from one or more stations. In 920, based on current resource assignments in each timeslot and based on the peer sets, excluded timeslots and preferred timeslots are determined. In 930, potential resources are marked in a peer-to-peer portion of a resource allocation map. In 940, one of the potential resources is allocated for peer-to-peer communication between a transmitter station and one or more receiver stations.

Figure 10:
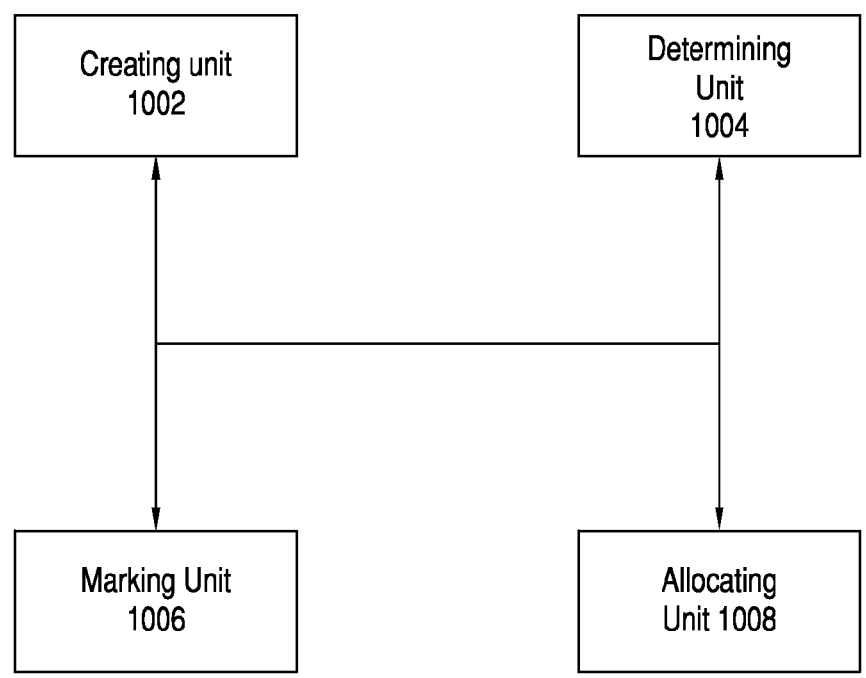
FIG. 10 is a block diagram of a station configured to allocate resources for peer-to-peer communications in accordance with some embodiments.

FIG. 10 is a block diagram of a station configured to allocate resources for peer-to-peer communications in accordance with some embodiments. The station 1000 includes a creating unit 1002, a determining unit 1004, a marking unit 1006 and an allocating unit 1008. Creating unit 1002 is configured to create or update peer sets from measured performance information received from one or more stations. Determining unit 1004 is configured to determine excluded timeslots and preferred timeslots based on current resource assignments in each timeslot and based on the peer sets. Marking unit 1006 is configured to mark potential resources in a peer-to-peer portion of a resource allocation map. Allocating unit 1008 is configured to allocate one of the potential resources for peer-to-peer communication between a transmitter station and one or more receiver stations.

Station 1000, for example, can be an integrated unit containing at least all the elements depicted in FIG. 10, as well as any other elements necessary for the server to perform its particular functions. Alternatively, station 1000 can include a collection of appropriately interconnected units or devices, wherein such units or devices perform functions that are equivalent to the functions performed by the elements of the station 1000. In some embodiments, station 1000 may include a random access memory and a programmable memory that are coupled to a processor. The processor may include ports for coupling to wireless network interfaces. The wireless network interfaces can be used to enable station 1000 to communicate with other node devices in an ad hoc wireless network or mesh network. The programmable memory can store operating code (OC) for the processor and code for performing functions associated with station 1000. For example, the programmable memory can include computer readable program code components configured to cause execution of a method for allocating resources for peer-to-peer communications as described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method in a base station for allocating resources for one-to-many peer-to-peer communications, the method comprising:
   creating or updating, in the base station, peer sets from measured performance information received from one or more stations;
   determining, based on the measured performance information, whether each of the one or more stations is a high impact peer or a low impact peer of stations associated with the one-to-many peer-to-peer communication;
   determining, in the base station, a preferred timeslot for the one-to-many peer-to-peer communication among medium or high impact peer stations based on current resource assignments in each timeslot, the peer sets, and the determination of whether each of the one or more stations is a high impact peer or a low impact peer of each station associated with the one-to-many peer-to-peer communication;
   marking, in the base station, potential resources in a portion of a resource allocation map based on the determination of the preferred timeslot; and
   allocating, in the base station, one of the potential resources for the one-to-many peer-to-peer communication between a transmitter station and a plurality of receiver stations.

2. The method of claim 1, wherein the allocating comprises reallocating resources when a Quality of Service performance metric determined for one or more selected communication links between the transmitter station and the one or more receiver stations indicates that continued use of the communication links may cause near/far problems.

3. The method of claim 1, wherein the determining comprises combining the excluded timeslots and the preferred timeslots for each communication link between the transmitter station and each of the one or more receiver stations to determine an aggregation of excluded timeslots and preferred timeslots for communication links between the transmitter station and the one or more receiver stations; and
   identifying a resource allocation of within the predefined timeslots for the communication links between the transmitter station and the one or more receiver stations.

4. The method of claim 1, wherein the determining comprises:
   creating communication groups between the transmitter station and two or more receiver stations; and
   identifying excluded timeslots and preferred timeslots corresponding to resource allocations for each communication group.

5. The method of claim 1, wherein the determining comprises:
   determining if an overall timeslot table is not updated for one transmitter station to receiver station link in a communication group;
   selecting a receiver station from the one or more receiver stations in the communication group and selecting a receiver timeslot table for the selected receiver station;
   applying proactive rules for marking preferred and excluded timeslots in the receiver timeslot table for a transmitter station to receiver station link in the overall timeslot table that is not updated;
   applying reactive rules for marking preferred and excluded timeslots in the receiver timeslot table in response to receiving a reactive response from the selected receiver station;
   marking a timeslot as excluded in the receiver timeslot table when the selected receiver station is transmitting information; and
   creating a summary timeslot table from individual receiver timeslot tables when the overall timeslot table is updated for all transmitter station to receiver station links in the communication group and marking preferred and excluded stations for each timeslot in the summary timeslot table.

6. The method of claim 1, wherein the determining comprises:
   determining if an overall timeslot table is not updated for one transmitter station to receiver station link in a communication group;
   selecting a receiver station from the one or more receiver stations in the communication group and selecting a receiver timeslot table for the selected receiver station;
   marking a timeslot allocated for transmission by a high impact peer of the selected receiver station as an excluded timeslot when applying proactive and reactive rules;
   marking a timeslot allocated for transmission by a high impact peer of the transmitter station as a preferred timeslot when applying proactive and reactive rules;
   marking a timeslot allocated for use by a high impact peer station of the transmitter station that is receiving information as an excluded timeslot when applying proactive and reactive rules;
   when the transmitter station has no high impact peers, marking low impact peer stations of the selected receiver station as preferred stations when applying proactive and reactive rules;
   when the selected receiver station has no high impact peers, marking low impact peer stations of the transmitter station as preferred stations when applying proactive and reactive rules;

marking a timeslot in the receiver timeslot table as preferred when the transmitter station and the selected receiver station are in a same high peer set when applying proactive and reactive rules;

marking a timeslot as excluded in the receiver timeslot table when a receiver station is transmitting information; and creating a summary timeslot table from individual receiver timeslot tables when the overall timeslot table is updated for all transmitter station to receiver station links in the communication group and marking preferred and excluded stations for each timeslot in the summary timeslot table.

7. The method of claim 1, wherein the allocating comprises:

determining that resources have not been allocated for a communication link between a receiver station and the transmitter station;

selecting the receiver station and identifying timeslots designated as preferred timeslots from the transmitter station to the selected receiver station;

if no timeslot is designated as a preferred timeslot, identifying timeslots designated as non-excluded or non-preferred from the transmitter station to the selected receiver station;

selecting a timeslot for the smallest resource allocation size from those timeslots designated as preferred timeslots or, if no timeslot is designated as a preferred timeslot, designated as non-excluded or non-preferred timeslots;

placing the selected receiver station in an unreachable receiver station list responsive to determining that at least one resource allocation is unavailable;

identifying time frequency resources from among available candidate resources for the communication link between the transmitter station and the selected receiver station responsive to determining that at least one resource allocation is available; and assigning a time frequency resource of the identified time frequency resources to the selected receiver station and placing the assigned resource in a resource allocation map.

8. The method of claim 7, wherein the identified time frequency resources are those that minimize the total resource allocation size to support a one-to-many communication link.

9. The method of claim 7, wherein the identified time frequency resources are those that minimize the use of one or more of non-excluded and/or non-preferred timeslots.

10. The method of claim 7, wherein the identified time frequency resources are those that maximize the reuse of time frequency resources among the one or more receiver stations.

11. The method of claim 1, wherein the allocating comprises combining the excluded time slots and the preferred time slots for each communication link between the transmitter station and each of the one or more receiver stations to determine an aggregation of excluded time slots and preferred time slots for communication links between the transmitter station and the one or more receiver stations, wherein the roles of the transmitter station and the one or more receiver stations is changed such that an individual aggregation is determined with each of the one or more receiver stations taking the role of the transmitter station.

12. The method of claim 1, wherein the allocating comprises pre-allocating resources for the one or more receiver stations to transmit information at a future time.

13. The method of claim 1, wherein the determining comprises pre-determining the excluded time slots and the preferred time slots for each of the one or more receiving stations in a role of the transmitter station.

14. The method of claim 1, wherein the allocating comprises pre-allocating resources for one or more stations subscribed to a communication group.

15. The method of claim 1, wherein the peer sets are groups as one of a high impact peer set, a middle impact peer set, or a low impact peer set, wherein a high impact peer set has a high probability of having a near-far problem, a medium impact peer set has a medium probability of having the near-far problem and a low impact peer set has a low probability of having the near far problem.

16. The method of claim 1, wherein the creating comprises:

generating a resource information element to obtain measurements for specified performance metrics from a station;

receiving a resource map response message from the station with the specified performance metrics; and processing the resource map response message to determine resources to be allocated to the station.

17. A base station configured to allocate resources for one-to-many peer-to-peer communications, the base station comprising a processor;

a programmable memory coupled to the processor and storing operating code that, when executed, cause the processor to:

create or update peer sets from measured performance information received from one or more stations;

determine, based on the measured performance information, whether each of the one or more stations is a high impact peer or a low impact peer of stations associated with the one-to-many peer-to-peer communication and determine a preferred timeslot for the one-to-many peer-to-peer communication among medium or high impact peer stations based on current resource assignments in each timeslot, the peer sets, and the determination of whether each of the one or more stations is a high impact peer or a low impact peer of each station associated with the one-to-many peer-to-peer communication;

mark potential resources in a portion of a resource allocation map based on the determination of the preferred timeslot; and allocate one of the potential resources for the one-to-many peer-to-peer communication between a transmitter station and a plurality of receiver stations.

18. The base station of claim 17, wherein operating code, when executed, further cause the processor to:

determine if an overall timeslot table is not updated for one transmitter station to receiver station link in a communication group;

select a receiver station from the one or more receiver stations in the communication group and selecting a receiver timeslot table for the selected receiver station;

apply proactive rules for marking preferred and excluded timeslots in the receiver timeslot table for a transmitter station to receiver station link in the overall timeslot table that is not updated;

apply reactive rules for marking preferred and excluded timeslots in the receiver timeslot table in response to receiving a reactive response from the selected receiver station;

mark a timeslot as excluded in the receiver timeslot table when a receiver station is transmitting information; and create a summary timeslot table from individual receiver timeslot tables when the overall timeslot table is updated for all transmitter station to receiver station links in the communication group and mark preferred and excluded stations for each timeslot in the summary timeslot table.

19. The base station of claim 17, wherein the operating code, when executed, further cause the processor to:
- determine if an overall timeslot table is not updated for one transmitter station to receiver station link in a communication group;
- select a receiver station from the one or more receiver stations in the communication group and selecting a receiver timeslot table for the selected receiver station;
- mark a timeslot allocated for transmission by a high impact peer of the selected receiver station as an excluded timeslot when applying proactive and reactive rules;
- mark a timeslot allocated for transmission by a high impact peer of the transmitter station as a preferred timeslot when applying proactive and reactive rules;
- mark a timeslot associated with a high impact peer station of the transmitter station that is receiving information as an excluded timeslot when applying proactive and reactive rules;
- when the transmitter station has no high impact peers, mark low impact peer stations of the selected receiver station as preferred stations when applying proactive and reactive rules;
- when the selected receiver station has no high impact peers, mark low impact peer stations of the transmitter station as preferred stations when applying proactive and reactive rules;
- mark a timeslot in the receiver timeslot table as preferred when the transmitter station and the selected receiver station are in a same high peer set when applying proactive and reactive rules;
- mark a timeslot as excluded in the receiver timeslot table when a receiver station is transmitting information; and
- create a summary timeslot table from individual receiver timeslot tables when the overall timeslot table is updated for all transmitter station to receiver station links in the communication group and mark preferred and excluded stations for each timeslot in the summary timeslot table.

20. The base station of claim 17, wherein the operating code, when executed, further cause the processor to:
- determine that resources have not been allocated for a communication link between a receiver station and the transmitter station;
- select the receiver station and identifying timeslots designated as preferred timeslots from the transmitter station to the selected receiver station;
- if no timeslot is designated as a preferred timeslot, identify timeslots designated as non-excluded or non-preferred from the transmitter station to the selected receiver station;
- select a timeslot for the smallest resource allocation size from those timeslots designated as preferred timeslots or, if no timeslot is designated as a preferred timeslot, designated as non-excluded or non-preferred timeslots;
- place the selected receiver station in an unreachable receiver station list responsive to determining that at least one resource allocation is unavailable;
- identify time frequency resources from among available candidate resources for the communication link between the transmitter station and the selected receiver station responsive to determining that at least one resource allocation is available; and
- assign a selected resource to the selected receiver station and placing the assigned resource in a resource allocation map.

* * * * *